Figure 1:
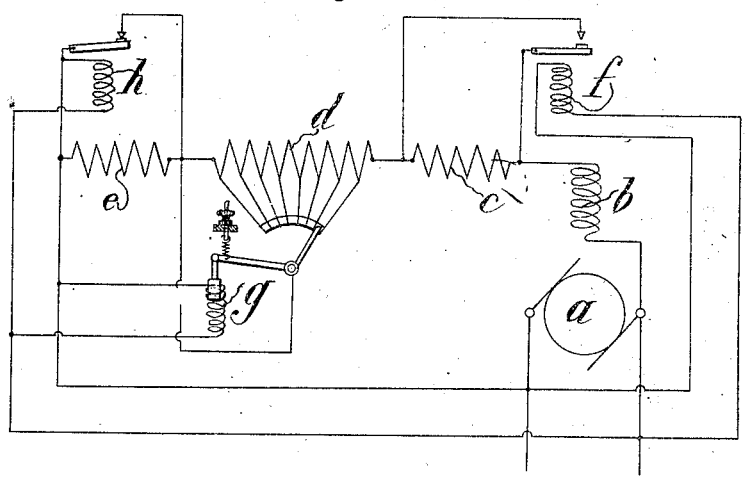

P. BOSSU.
VOLTAGE CONTROLLING MECHANISM.
APPLICATION FILED SEPT. 28, 1918.

Patented Nov. 8, 1921.

Witnesses:

Inventor
Pierre Bossu

UNITED STATES PATENT OFFICE.

PIERRE BOSSU, OF NEUILLY-SUR-SEINE, FRANCE, ASSIGNOR TO SOCIETE ANONYME DES ETABLISSEMENTS L. BLERIOT, OF PARIS, FRANCE.

VOLTAGE-CONTROLLING MECHANISM.

1,396,552. Specification of Letters Patent. Patented Nov. 8, 1921.

Application filed September 28, 1918. Serial No. 256,102.

*To all whom it may concern:*

Be it known that I, PIERRE BOSSU, citizen of the French Republic, residing at Neuilly-sur-Seine, Department of Seine, France, have invented certain new and useful Improvements in Voltage-Controlling Mechanisms, of which the following is a specification.

This invention relates to voltage controlling mechanism for electric installations and is particularly applicable to dynamos or installations adapted to operate at a constant voltage.

It is known that in regulating mechanism of the above kind use has been made, hitherto of quick-acting regulators, that is to say, regulators which insure the regulation of the voltage by means of a resistance, not, however, by cutting in, into the circuit to be controlled, a greater or smaller portion of the total resistance, but by intercalating in the said circuit the total resistance for a longer or shorter time interval. These quick-acting regulators while presenting the advantage of a great rapidity of action thereby avoiding any accident, such as any variation of the voltage, even in the case of a very great instability, have nevertheless the defect that their contacts are subject to rapid wear.

For the same purpose, use has also been made of slow-acting regulators, that is to say, regulators insuring the regulation by interposing in the circuit for a more or less permanent period, a smaller or less greater portion of the total resistance. These slow-acting regulators offer on the one hand the advantage that they do not necessitate, as in the case of quick-acting regulators, a frequent refitting of their contacts, but on the other hand present the drawback of acting in a relatively slow manner which in certain cases is liable detrimentally to affect the stability of the voltage.

Now, this invention has for its object to combine the advantages both of quick-acting and slow-acting regulators without their drawbacks and with this object in view the invention consists, broadly speaking, in mechanism comprising a slow-acting regulator and a quick-acting regulator in such relation that the latter becomes operative only when the voltage exceeds slightly the value of the voltage to be maintained constant and moreover that when the voltage does tend to rise, the said quick-acting regulator is operative only during the time necessary for the slow-acting regulator to exercise its control. If desired use may be made in the same mechanism of a second quick-acting regulator arranged so as to act only for a voltage slightly lower than that of the requisite constant voltage and when the tension tends to fall, to be operative only again during the time requisite for the slow acting regulator to insure the regulation.

In addition to this chief characteristic the invention comprises certain other provisions hereinafter more fully referred to.

The accompanying drawings show, by way of example, certain embodiments of the invention.

Figure 3:
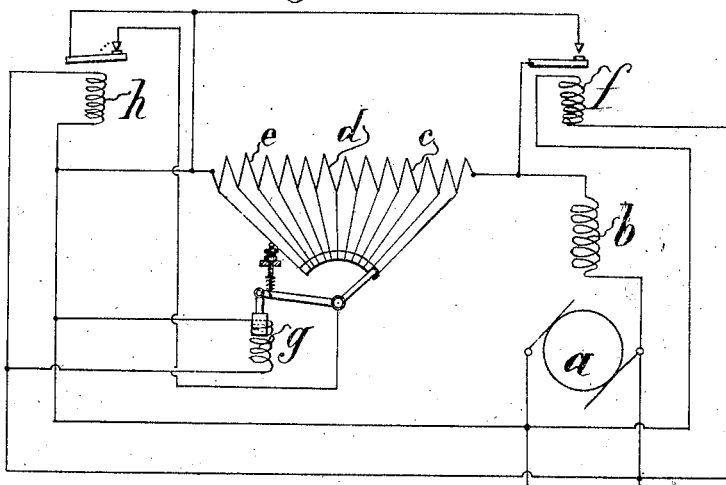
Figure 2:
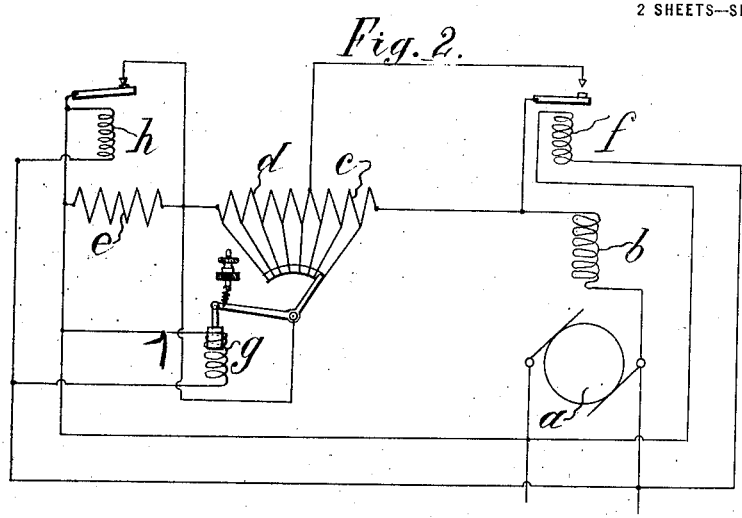
Figure 4:
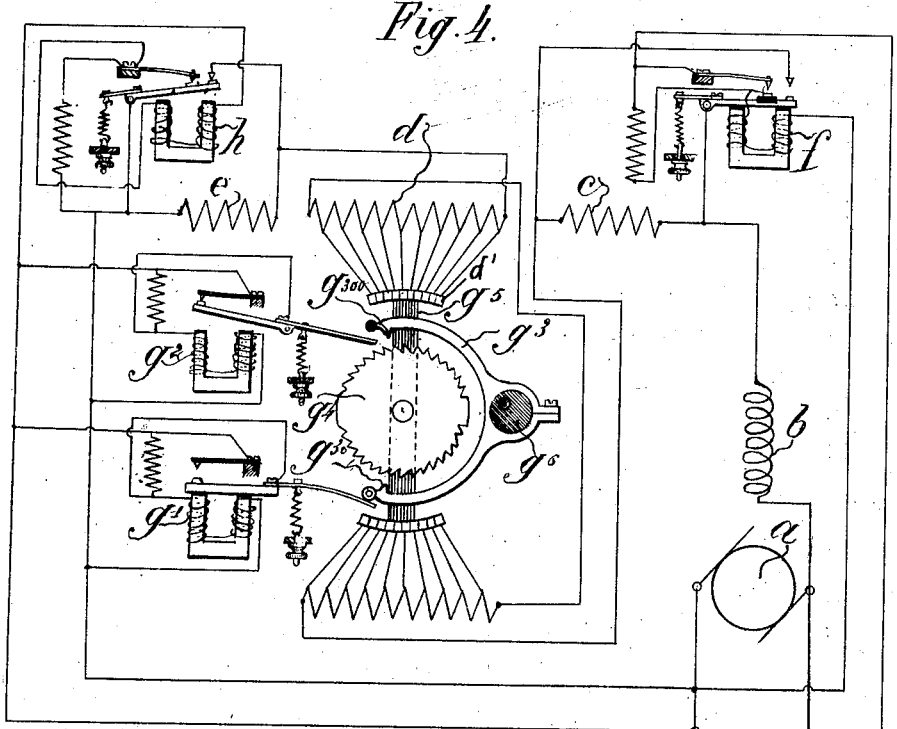

Figures 1 to 3 represent three diagrams of regulating mechanism arranged according to this invention, and In Fig. 4 is represented diagrammatically a constructional development of an improved regulating mechanism of this kind.

In the example shown the regulating mechanism according to this invention is intended for a dynamo $a$ so that by the cutting in of a regulating resistance in the circuit of its excitation shunt winding $b$, the voltage of the said dynamo should be maintained at a constant value E.

Interposed in the circuit of the shunt inductor winding of the dynamo $a$ are, in series, three regulating resistances $c$, $d$, $e$. The two terminals of the resistance $c$ are connected to the two contacts of a quick-acting lower regulator $f$, so arranged as to insure the engagement of the said contacts and, consequently, the short-circuiting of the resistance $c$ for any value of the voltage below $E-e^1$ which is somewhat lower than E and the separation of the said contacts for any voltage above said voltage $E-e^1$. In other words, the attraction and the releasing of the armature of said quick-acting regulator $f$ takes place at the same voltage $E-e^1$, owing to the exact compensation of the electro-magnet as regards the effect on its magnetic reluctance, due to the movements of its armature.

The resistance $d$ is constituted by a certain number of elementary resistances arranged so that they may be cut in or out of the circuit successively by a slow-acting regulator $g$ controlled by preference in such manner that it operates between the lower limit of a voltage $E-e^2$ lying above the active tension $E-e^1$ of the quick-acting regulator, said lower limit being comprised between said $E-e^1$ and E, and an upper limit of a voltage $E+e^4$ which is slightly higher than E.

Finally, the terminals of the resistance $e$ are connected to the two contacts of a quick-acting upper regulator $h$ arranged so as to insure the separation of its regulating contacts, and, consequently, the cutting in of the resistance $e$ for any voltage values above $E+e^5$ which is somewhat higher than the upper limit of the slow-acting regulator designated above by $E+e^4$. The engagement of the said regulating contacts and consequently the short circuiting of the said resistance $e$ takes place for any voltage value below $E+e^5$. In other words, the attraction and the releasing of the upper quick-acting regulator takes place at practically the same voltage which is always above the upper voltage limit of the slow-acting regulator.

Accordingly, as long as the voltage remains substantially constant, that is to say, remains between the upper and lower voltage limits of the slow-acting regulator (which may be chosen as close to one another as desired) and beyond which the quick-acting regulators commence to be operative, the regulation is insured by the slow-acting regulator alone; but as soon as the voltage rises above the upper limit or falls below the lower voltage limit of the slow acting regulator, one of the quick-acting regulators becomes operative, maintaining the voltage at the value corresponding to the said limit and opposing any extreme rise or fall of the voltage up to the moment at which the slow-acting regulator, having had time to act, restores the voltage to the value E.

In an arrangement of this kind it is preferable that the above explained well proportioned difference of voltage for which the different regulators are operative should remain constant, or at least remain in a mutually constant relation in order to avoid that at a given moment, in consequence of a spontaneous effect of a variation of temperature or barometric pressure, the slow-acting regulator would not need to enter into the regulation at all, when one of the quick-acting regulators would, by itself, assure the regulation between the limits embracing the limits of function of the slow-acting regulator.

For this purpose of reliable relations between the different regulating voltage limits, use is made by preference of quick and slow-acting regulators having electromagnets compensated both as regards variations of reluctance of the magnetic circuit due to the movement of the armature, and as regards variations of temperature, external or internal and as regards the modifying effect of the ohmic resistance of changes in barometric or atmospheric pressure.

For example, as shown in Fig. 4, use is made of two quick-acting regulators $f$ and $h$ having full compensation or almost full compensation of their electro-magnets, this being a favorable condition for a proper vibration of the armature. The armature of the lower quick-acting regulator $f$ is attracted for a predetermined voltage $E-e'$, this corresponding with the opening of the contacts. The armature is released for the same voltage $E-e'$ (or a very slightly lower voltage). The armature of the upper quick-acting regulator $h$ is attracted for a predetermined voltage $E+e^5$, for the opening of the contacts, and is released for the same voltage (or a very slightly lower voltage), owing to a full or almost full compensation. The slow acting regulator $g$ has two compensation magnets $g'$ and $g^2$, of which the magnet $g'$ (termed the lower controlling electro-magnet) is so calculated that its armature for the constant voltage value E or for a slightly lower voltage, and is released for the lower voltage limit of the slow regulator, namely $E-e^2$. This voltage limit is in all cases slightly lower than that for which the armature is attracted, because in this case full compensation is not desirable. The other compensation magnet $g^2$ (termed upper controlling electro-magnet) is so calculated that its armature is attracted for the upper voltage limit $E-e^4$ of the slow regulator, said upper limit being slightly above the voltage E. The armature of this magnet is released either for the voltage E or for a very slightly greater voltage than E, termed $E+e^3$. There is no full compensation obtained for $g^2$ so that for $g^2$ there is a difference between the voltage of attraction and the voltage of release. Combined with these two upper and lower controlling electro-magnets is an anchor $g^3$ the shanks of which are provided with two hooks $g^{30}$ and $g^{300}$ so that they may act, one in one sense and the other in another sense, on a ratchet wheel $g^4$ having two sets of oppositely inclined teeth. This ratchet wheel is integral with a brush $g^5$ wiping on a circular commutator $d^1$ connected to which are the different elements of the resistance $d$. The anchor $g^3$ is so arranged as to receive continuously an oscillating movement, for example by an eccentric $g^6$, and it is under the influence of the upper and lower controlling electro-magnets $g^1$, $g^2$ so that if the armature of the electro-magnet $g^1$ alone is attracted (as shown) neither of the pawls $g^{30}$, $g^{300}$ can engage with the ratchet wheel $g^4$, while when the armatures of both magnets are in attracted position, the hook $g^{30}$ is free to act on the ratchet, and when both armatures are released, the ratchet wheel may be influenced by the hook $g^{300}$. It will be understood that no vibratory action is desirable for actuation of these hooks, so that incomplete compensation of the controlling electro-magnets thereof, and which will cause definite movements of their armatures, is preferable.

Assuming for the sake of a more concrete example, that the voltage E to be maintained constant is E=110 V., that the voltage for which the armature of the quick-acting lower regulator $f$ is attracted, as well as released (due to its full compensation) is E—$e^1$=109,8 V., the voltage for the release of the armature of the lower controlling electro-magnet $g^1$ is E—$e^2$=109,9 and for its attraction due to its voluntary incomplete compensation, a higher voltage, for instance E=110 V.; that the armature of the upper controlling electro-magnet $g^2$ is released by a voltage very little above E=110 V. for example, by E+$e^3$=110,1 V., and attracted for a higher voltage due to its voluntary incomplete compensation, termed voltage E+$e^4$=110,2 V.; and that the armature of the quick-acting upper regulator $h$ is attracted and released for the same somewhat higher voltage E+$e^5$=110,3 V., then the arrangement will operate as follows:

For the normal voltage of 110 V. the parts are inoperative, that is to say, the resistance $c$ is cut in as a result of the attraction of the armature of the quick-acting regulator $f$, the anchor $g^3$ is out of engagement with the ratchet wheel $g^4$, since only the armature of the electro-magnet $g^1$ of the slow-acting regulator is in attraction.

Now, in the event of the voltage falling slowly, the magnet $g^1$ releases its armature, and the hook $g^{300}$ is caused to engage with the teeth of the ratchet wheel $g^4$, rotating the latter so as to reduce the number of elements of the resistance $d$ interposed in the circuit. The voltage is therefore restored to its normal value, because the speed at which the resistances are withdrawn from the circuit is sufficient for a relatively slow variation. As soon as the voltage has reached its normal value, the armature of the electro-magnet $g^1$ is attracted, the pawl $g^{300}$ is disengaged from the ratchet, and all parts return to a position of rest.

If the tension drops quickly and the speed of the regulation of the slow-acting regulator is not sufficient to catch up or to follow such variation, the voltage may drop sufficiently (down to 109,8 V.) to cause the lower quick-acting regulator $f$ to come into action, and the latter in short-circuiting the resistance $c$ prevents the voltage from falling below that value. This quick-acting regulator $f$ continues to exert its influence until the moment at which the slow-acting regulator has corrected the voltage so that, from that moment, the quick-acting regulator $f$ maintains its armature in the attracted position, as according to its peculiar voltage-limit arrangement, it cannot itself restore the voltage up to 110 V. while the slow-acting regulator does so. Thus the wear of the sparking contacts becomes negligible.

If the voltage rises slowly, the upper controlling electromagnet $g^2$ attracts its armature with the result that the hook $g^{30}$ engages with the ratchet $g^4$, and rotates the latter in order to augment the number of elements of the resistances $d$ in the circuit, so that the voltage is restored to its normal value since the speed with which the resistances are added to the circuit, is sufficient for a relatively slow variation.

As soon as the voltage has reached its normal value, the armature of the upper controlling electromagnet $g^2$ is released, the hook $g^{30}$ is disengaged from the ratchet $g^4$ and all parts resume their position of rest.

Finally, if the voltage rises rapidly and the controlling speed of the slow-acting regulator is insufficient to catch up or to follow the variation, the voltage may rise sufficiently (up to E+$e^5$ 110.3 V.) to cause the quick-acting upper regulator $h$ to become operative, and by cutting in the resistance $e$, to prevent the voltage from rising above said value. As owing to its arrangement the quick-acting regulator $h$ cannot itself restore the tension to 110 V. it continues to act only until near the moment at which the slow-acting regulator continuing to operate, has corrected the voltage, so that the quick-acting upper regulator maintains its armature in the released position, and, consequently, is no longer operative.

A controlling mechanism of this kind will insure the regulation as quickly as a regulating device comprising simply a quick-acting regulator with this advantage, however, that in the improved arrangement the wear on the contacts of the quick acting regulators will be little felt, owing to the fact that on the one hand the quick-acting regulators act solely for the purpose of correcting the occasional extremely rapid rising or falling of voltage, carrying the same to the extreme voltage limits of the quick-acting regulators which are outside the reach of the slow-acting regulator, and on the other hand because the resistances to be short-circuited by them will be less considerable than in the case of only a single quick-acting regulator, so that the sparks at the contacts will be less destructive.

Moreover, a mechanism of this kind may, with advantage, be utilized in connection with dynamos of greatly unstable reactions in their working, particularly where they are not stabilized by a battery of accumulators.

Obviously, the invention is not to be held limited to any of the specific arrangements hereinbefore more particularly described for it is capable, without departing from its chief characteristics, of numerous modifications, for instance.

As shown in Fig. 2, the resistance $c$ may be combined with the resistance $d$, or constituted, by a portion of the resistance $d$, or by the total resistance $d$;

or, as illustrated in Fig. 3, the three resistances $c$, $d$, $e$ may be combined into one, in which case the resistances $c$ and $e$ may be constituted either by a portion of the resistance $d$ or by the total resistance $d$;

or the quick-acting regulator $f$ may be dispensed with, where the fall of the voltage below the lower limit does not, in reality, present any danger.

I claim as my invention:—

1. A controlling mechanism for maintaining constant voltage in an electric circuit comprising in combination, a slow-acting regulator operative to introduce a variable controlling resistance progressively into such circuit, and quick-acting regulators coöperative with said slow-acting regulator and operative only during the time necessary for the slow-acting regulator to exercise its control.

2. A controlling mechanism as described in claim 1, wherein one of the quick-acting regulators is operative only when the voltage exceeds slightly the value of the voltage to be maintained constant and such voltage tends to rise, and wherein the other quick-acting regulator is operative only for a voltage slightly lower than the voltage to be maintained and such voltage tends to fall.

3. A controlling mechanism as described in claim 1 which comprises a slow acting regulator which acts on the voltage by means the controlling resistance of which is a rheostat the sections of which are cut in and cut out by its action, and separate resistances which are cut in and cut out by the quick-acting regulator.

4. A controlling mechanism as described in claim 2, comprising a rheostat upon which the slow acting regulator acts and the sections of which are cut in and cut out of the circuit to influence the voltage, and two separate resistances, which are cut in and cut out by the upper and lower quick acting regulators.

5. A controlling mechanism as described in claim 1, comprising armatures for the electro-magnets which are compensated for the effects of variations in the magnetic reluctance which occurs through their movements, thus insuring exact response of the controlling electro-magnets and proper vibration of the quick-acting regulators.

6. A controlling mechanism as described in claim 1, wherein the electro-magnets of the quick-acting regulators are fully compensated for the effects of variations in the magnetic reluctance due to the movements of their armatures so that their armatures are fully attracted or fully released practically at the same voltage and their vibration facilitated, and the controlling electro-magnets of the slow acting regulator are incompletely compensated for the effects of variations in the magnetic reluctance due to the movements of their armatures so that their releasing voltage is below their attracting voltage, whereby such latter electro-magnets have a non-vibratory and positive action.

In testimony whereof I have hereunto set my hand in presence of two subscribing witnesses.

PIERRE BOSSU.

Witnesses:
 EUGIN PELLIER,
 JOHN F. SIMONS.